Feb. 6, 1968 R. C. HATHORN 3,367,400
APPARATUS FOR MAKING CYLINDRICAL ARTICLES
Filed June 18, 1965 3 Sheets-Sheet 2
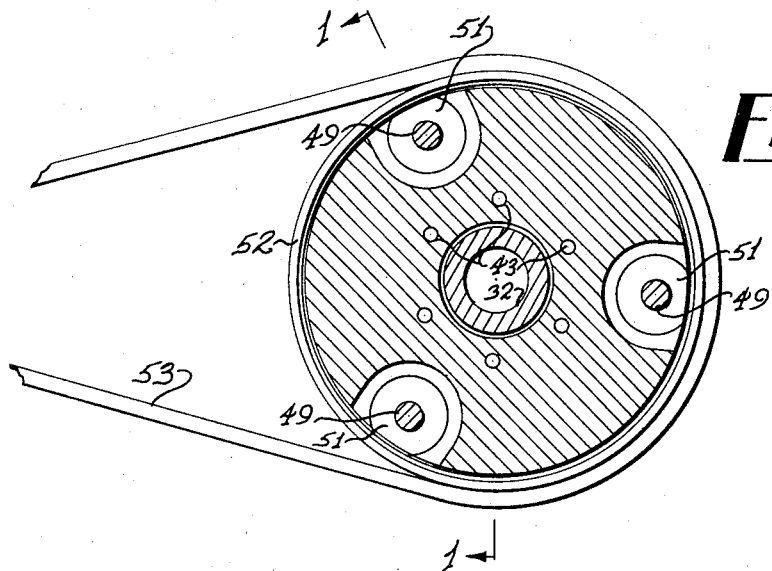
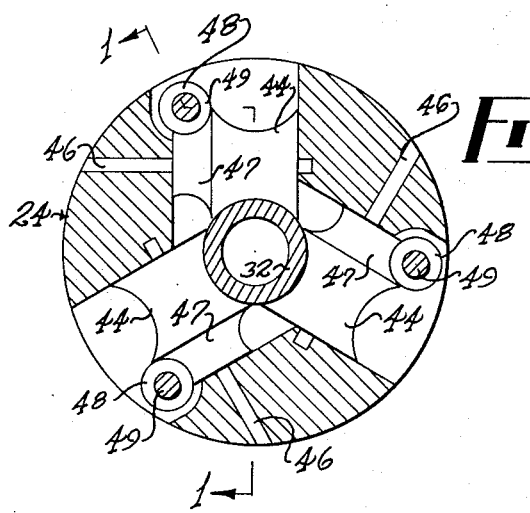
INVENTOR.
Roy C. Hathorn
BY
Jennings, Carter + Thompson
Attorneys

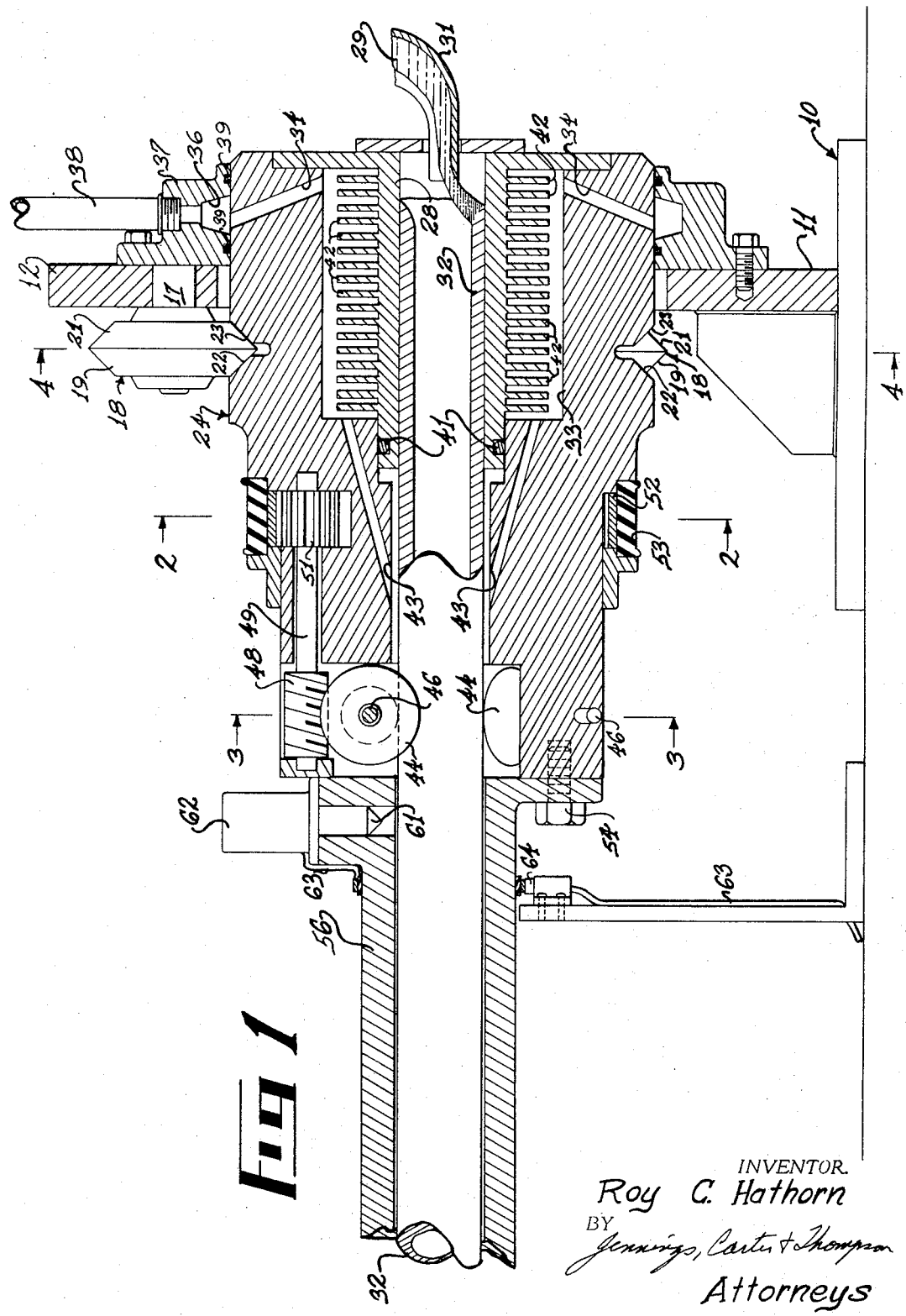

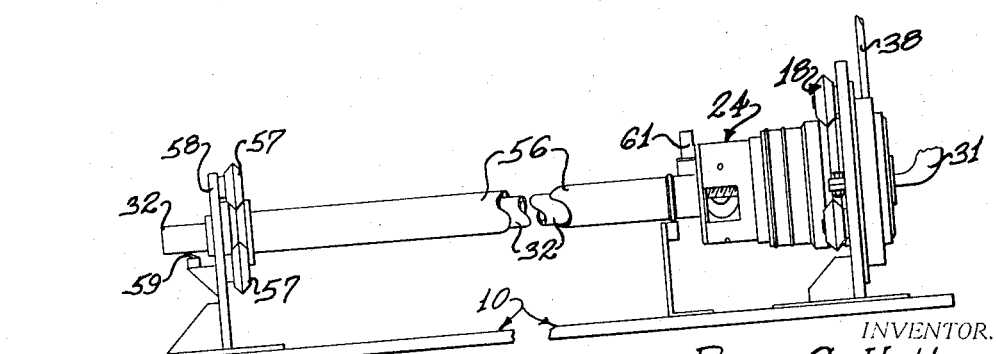

United States Patent Office 3,367,400
Patented Feb. 6, 1968

3,367,400
APPARATUS FOR MAKING CYLINDRICAL
ARTICLES
Roy C. Hathorn, 1309 Kilby Terrace,
Anniston, Ala. 36201
Filed June 18, 1965, Ser. No. 465,021
5 Claims. (Cl. 164—282)

ABSTRACT OF THE DISCLOSURE

Apparatus for making cylindrical articles in a rotary mold into which molten metal is fed and progressively solidified as a cylindrical article which is withdrawn into a rotary cylindrical member mounted in position to receive the cylindrical article. The cylindrical member and the mold are rotated at the same speed to support the tender article without distortion.

This invention relates to the process and apparatus for forming cylindrical articles, such as pipe and the like and more particularly to such a process and apparatus which forms the cylindrical article by a combination of centrifugal casting and continuous casting.

An object of my invention is to provide a process and apparatus for making cylindrical articles of the character designated which shall include the combined steps of introducing molten metal continuously into a rotary mold to form centrifugally a hollow metal body therein, abstracting heat from the molten metal to progressively solidify the same and then continuously withdrawing the solidified metal from the rotary mold in the form of a cylindrical article.

Another object of my invention is to provide a process and apparatus for making cylindrical articles of the character designated in which the tender cylindrical member is continuously withdrawn from the rotary mold in a uniform manner whereby the cylindrical article is not distorted upon removal from the mold.

A further object of my invention is to provide a process and apparatus for making cylindrical articles of the character designated which shall include improved means for rotating and supporting the mold from a supporting frame, together with means for separating one portion of the frame from the remainder thereof whereby the rotary mold is removable, thus adapting the supporting frame for supporting rotary molds of various sizes.

A further object of my invention is to provide a process and apparatus for making cylindrical articles of the character designated in which the tender cylindrical article is supported by a cylindrical supporting member which is adapted to rotate at the speed of rotation of the rotary mold whereby the cylindrical article is not twisted after removal from the mold.

A still further object of my invention is to provide apparatus for making cylindrical articles which shall be simple of construction and operation and one which is adapted to produce cylindrical articles of various lengths and diameters.

Apparatus embodying features of my invention and which may be employed to carry out my improved process is illustrated in the accompanying drawings, forming a part of this application, in which:

FIG. 1 is a vertical sectional view through the apparatus, partly broken away and in section, and taken generally along the lines 1—1 of FIGS. 2 and 3;

FIG. 2 is a sectional view, partly broken away, taken generally along the line 2—2 of FIG. 1;

FIG. 3 is a sectional view taken generally along the line 3—3 of FIG. 1;

FIG. 4 is a sectional view, partly broken away, taken generally along the line 4—4 of FIG. 1; and, FIG. 5 is a side elevational view, partly broken away and in section, showing the apparatus supported in an inclined position to provide proper angle for solidifying the cylindrical articles.

Referring now to the drawings for a better understanding of my invention, I show a supporting frame 10 having a lower, vertically extending portion 11 and an upper vertically extending portion 12. The upper end of the vertical portion 11 is provided with an outturned flange 13 which abuts an outturned flange 14 carried by the upper portion 12 of the supporting frame. The flanges 13 and 14 are detachably connected to each other by suitable means, such as bolts 16.

Angularly spaced shafts 17 are carried by the upper and lower portions 11 and 12 of the supporting frame. As shown in FIGS. 1 and 4, the shafts 17 extend generally perpendicularly to the portions 11 and 12. Mounted for rotation on the shafts 17 are angularly spaced rolls 18. The periphery of each roll 18 tapers to provide annular, converging surfaces 19 and 21 which are adapted to engage inwardly converging, annular surfaces 22 and 23, respectively, of a rotary mold indicated generally at 24. As shown in FIG. 4, the rolls 18 are positioned approximately 120° apart whereby the annular surfaces 19 and 21 engage the surfaces 22 and 23 to assure perfect alignment of the rotary mold 24 while it is supported by the rolls 18. Mounted on one of the shafts 17, as shown in FIG. 4, is a sprocket 26 which is driven by a sprocket chain 27 to impart rotation to the adjacent roll 18.

As shown in FIGS. 1 and 4, the mold 24 is provided with an inner liner 28 which is formed of a suitable material, such as beryllium copper alloy. Molten metal 29 is introduced into the liner 28 by a pouring boot 31 whereby the centrifugal action of the rotating mold forms a hollow, metal body 32 within the liner 28.

Heat is abstracted from the molten metal introduced into the liner 28 whereby the molten metal progressively solidifies as it is drawn through the liner 28 in a manner to be described hereinafter. To abstract the heat from the molten metal, I provide an annular cooling chamber 33 outwardly of the sleeve 28, as shown in FIGS. 1 and 4. A cooling liquid, such as water, is introduced into the cooling chamber 33 by providing a plurality of outwardly extending ports 34. One end of each port 34 communicates with the chamber 33 while the other end of each port communicates with an annular chamber 36 defined within a collector ring 37 which surrounds the rotary mold 24, as shown in FIG. 1. Cooling liquid is introduced into the annular chamber 36 by a suitable supply conduit 38. Suitable seals 39 are interposed between the collector ring 37 and the rotary mold 24, as shown. Also, a suitable seal 41 is provided between the sleeve 28 and the remainder of the rotary mold 24. Surrounding the sleeve 28 within the cooling chamber 33 are a plurality of cooling fins 42. As shown in FIG. 1, the cooling liquid is introduced through the ports 34 adjacent the receiving end of the sleeve 28 of mold 24. The cooling liquid is discharged from the cooling chamber 33 adjacent the opposite end of the sleeve 28 through ports 43. As clearly shown in FIG. 1, the discharge ends of the ports 43 are in position to introduce the cooling liquid onto the outer surface of the solidified metal 32 after it is removed from the sleeve 28. The introduction of the cooling liquid onto the exterior surface of the solidified metal article continuously removes scale and other foreign materials from this area of the solidified cylindrical article.

The solidified article 32 is removed continuously from the sleeve 28 of the rotary mold 24 by providing angularly spaced feed rolls 44, as shown in FIGS. 1 and 3. The periphery of each feed roll 44 is concave, as viewed in transverse cross section, whereby the portion thereof engaging the solidified cylindrical article 32 corresponds generally to the surface of the article contracted by the feed roll. Each feed roll 44 is rotatably mounted on a shaft 46 which may be carried by the housing of the rotary mold 24, as shown in FIGS. 1 and 3. Each feed roll 44 is connected non-rotatably to a worm gear 47 which in turn meshes with a worm 48 carried by a shaft 49. Mounted non-rotatably on each shaft 49 is a pinion 51 which meshes with inwardly extending teeth of a ring gear 52. Preferably, the shafts 49 and pinions 51 are spaced an angular distance of approximately 120° relative to each other whereby the feed rolls 44 are also positioned approximately 120° relative to each other, as shown in FIG. 3. As clearly shown in FIG. 3, the contact surfaces of the feed rolls 44 with the cylindrical article 32 define a circle to thus prevent distortion of the tender article as it is continuously withdrawn from the rotary mold 24 by the feed rolls. The ring gear 52 is driven by a flexible drive member 53. Variation in the speed of rotation of the feed rolls 44 is controlled by the speed of rotation of the flexible drive 53 and the ring gear 52 relative to the speed of rotation of the rotary mold 24. For example, if the rotary mold 24 is rotating at 200 r.p.m. and the ring gear 52 is rotating at 250 r.p.m., the difference in speed of 50 r.p.m. will be transmitted to the feed rolls 44 through the worms 48, shafts 49 and pinions 51. Variations in speed can be accomplished with conventional type variable speed drives which may be propelled by electric motors, hydraulic motors or other suitable source of power.

Secured to one end of the housing of the rotary mold 24 by suitable means, such as bolts 54 is an elongated cylindrical member 56 which is of a length to support an entire length of the cylindrical article 32 being cast. The end of the cylindrical member 56 opposite the rotary mold 24 may be supported by suitable means, such as by providing angularly spaced idler rolls 57 which are supported by upstanding support 58 carried by the supporting frame 10. By rotating the elongated cylindrical member 56 at the same speed as the rotary mold 24, the cylindrical article 32 is not twisted in any manner after it is withdrawn from the rotary mold 24. Also, the cylindrical member 56 supports the entire length of the cylindrical article 32 to prevent bending thereof.

Mounted on the upstanding member 58 adjacent the discharge end of the cylindrical member 56 is a limit switch 59 which is in position to be engaged by the end of the cylindrical article 32 as it moves outwardly of the cylindrical member 56, as shown in FIG. 5. To sever the cylindrical article 32 after a predetermined length thereof has passed into the cylindrical article 56, a shearing element 61, such as a flying shear, is carried by the cylindrical member 56 adjacent the discharge end of the rotary mold 24, as shown in FIGS. 1 and 5. The plunger of the flying shear 61 may be actuated by suitable means, such as by an electrical solenoid 62 which is operatively connected to the limit switch 59 by a line 63 having a ring and brush unit indicated generally at 64 associated therewith to transmit to the rotating solenoid 62 in a manner well understood in the art. The rotating shear 61 fractures the cylindrical article 32 whereby it may be then withdrawn from the cylindrical member 56. The severing operation is accomplished in one revolution of the rotary mold 24.

From the foregoing description, the operation of my improved apparatus and the manner in which my improved process is carried out will be readily understood. The rotary mold 24 is rotated by imparting rotary motion to the flexible drive 27 and the pinions 52 are driven by imparting rotary motion to the flexible drive 53 whereby the feed rolls 44 are continuously rotated as the rotary mold 24 rotates. The rotary mold 24 is rotated at a speed for the centrifugal action to form the cylindrical article 32 within the sleeve 28 of the rotary mold as the molten metal 29 is continuously introduced through the boot 31. A cooling liquid, such as water, is continuously introduced through the supply conduit 38 whereby it circulates through the cooling chamber 33 and is then discharged onto the exterior surface of the cylindrical article 32 after it passes from the sleeve 28. The impingement of the cooling liquid onto the exterior surface of the cylindrical article 32 provides additional cooling of the cylindrical article and at the same time continuously washes scale and other foreign materials from the feed roll area. As the cylindrical article 32 leaves the feed rolls 44 it passes into the rotating cylindrical member 56 whereby the tender article 32 is supported. By rotating the cylindrical member 56 at the same speed as the rotation of the rotary roll 24, there is no angular distortion of the cylindrical article 32 about its longitudinal axis as it passes through the cylindrical member 56. Upon reaching the discharge end of the cylindrical member 56, the article 32 engages the limit switch 59 which in turn energizes the solenoid 62 to actuate the flying shear 61 whereby the cylindrical article 32 is severed. The article 32 is then removed from the cylindrical member 56.

To change the sizes of the rotating molds 24 and the various components carried thereby, the uppermost roll 18 is removed whereby the entire rotary mold unit 24 could then be removed from the lowermost supporting rolls 18. Another size rotary mold 24 could then be installed very quickly whereby a minimum of time would be lost when changing to the various mold sizes. That is, my apparatus would be adapted to produce cylindrical articles, such as pipe, in any length within reason and in diameters as small as possible to cast with centrifugal force. As shown in FIG. 5, the frame 10 may be inclined to provide proper angle for solidifying the walls of the cylindrical member 32.

From the foregoing, it will be seen that I have devised an improved process and apparatus for making cylindrical articles. By combining the steps of centrifugal casting with continuous casting, the cylindrical article is continuously formed in the rotary mold and then removed therefrom without any distortion of the cylindrical article. Also, by providing an elongated cylindrical member for supporting the tender article after it is removed from the rotary mold, the article thus cast is supported after removal from the mold until it has the strength to be removed. By providing means for continuously cooling the rotary mold as the metal is progressively solidified therein and then discharging the cooling liquid onto the exterior surface of the cylindrical article being cast, scale and other foreign materials are thoroughly washed from the feed roll area whereby the feed rolls are always in firm engagement with the exterior surface of the article 32 to thus assure uniform removal of the article from the mold.

Furthermore, by providing concave surfaces on the feed rolls which correspond generally to the contacted area of the article being removed, there is no distortion of the article as it is withdrawn from the mold.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. Apparatus for making a cylindrical article comprising:
   (a) a rotary mold,
   (b) means to feed molten metal continuously into said mold,
   (c) means to rotate said mold to form centrifugally a hollow metal body therein,
   (d) means to abstract heat from the molten metal to progressively solidify the same,
   (e) means to withdraw the solidified metal from the rotary mold in the form of a cylindrical article,
(f) a rotary cylindrical member mounted adjacent to and in axial alignment with said rotary mold for supporting the cylindrical article after it passes from the rotary mold, and
(g) means to rotate said rotary cylindrical member at the same speed as said rotary mold.

2. Apparatus for making a cylindrical article as defined in claim 1 in which a liner is provided within said rotary mold to receive the molten metal and a cooling chamber surrounds said liner and means is provided to circulate a cooling liquid continuously through said cooling chamber to abstract heat from the molten metal and then discharge said cooling liquid onto said cylindrical article after it has passed out of said liner.

3. Apparatus for making a cylindrical article as defined in claim 1 in which the means to withdraw the solidified cylindrical article from the rotary mold comprises:
(a) angularly spaced feed rolls disposed to contact the outer surface of the solidified cylindrical article adjacent the discharge end of the rotary mold and adjacent the receiving end of said rotary cylindrical member, and
(b) the outer surface of each feed roll being concave as viewed in cross section with the portion thereof engaging said solidified cylindrical article defining a circle and corresponding generally to the surface of said article contacted by the feed roll to prevent distortion of the article.

4. Apparatus for making a cylindrical article as defined in claim 1 in which the rotary cylindrical member is operatively connected to said rotary mold whereby it rotates therewith.

5. Apparatus for making a cylindrical article as defined in claim 1 in which the rotary mold is supported by apparatus comprising:
(a) a supporting frame,
(b) angularly spaced rolls carried by said supporting frame supporting said mold for rotation within the confines of said rolls, and
(c) said supporting frame being divided into separable sections detachably connected to each other so that a section thereof carrying at least one of said rolls is removable for removal of said rotary mold from said frame.

References Cited
UNITED STATES PATENTS

| | | | |
|---|---|---|---|
| 1,223,676 | 4/1917 | De Lavaud | 164—282 |
| 2,408,514 | 10/1946 | Hazelett | 164—282 XR |
| 2,477,030 | 7/1949 | Wnetig | 164—282 |
| 2,707,813 | 5/1955 | Dickson | 164—85 XR |
| 1,444,953 | 2/1923 | Crane | 164—84 |

J. SPENCER OVERHOLSER, *Primary Examiner.*

R. S. ANNEAR, *Assistant Examiner.*